United States Patent
Yin et al.

(10) Patent No.: US 7,733,369 B2
(45) Date of Patent: Jun. 8, 2010

(54) VIEW HANDLING IN VIDEO SURVEILLANCE SYSTEMS

(75) Inventors: Weihong Yin, Herndon, VA (US); Andrew J. Chosak, Arlington, VA (US); John Ian Wallace Clark, Leesburg, VA (US); Geoffrey Egnal, Washington, DC (US); Matthew F. Frazier, Arlington, VA (US); Niels Haering, Reston, VA (US); Alan J. Lipton, Herndon, VA (US); Donald G. Madden, Falls Church, VA (US); Michael C. Mannebach, Fairfax, VA (US); Gary W. Myers, Ashburn, VA (US); James S. Sfekas, Seattle, WA (US); Péter L. Venetianer, McLean, VA (US); Zhong Zhang, Herndon, VA (US)

(73) Assignee: ObjectVideo, Inc., Reston, VA (US)

( * ) Notice: Subject to any disclaimer, the term of this patent is extended or adjusted under 35 U.S.C. 154(b) by 1452 days.

(21) Appl. No.: 10/950,680

(22) Filed: Sep. 28, 2004

(65) Prior Publication Data

US 2006/0066722 A1    Mar. 30, 2006

(51) Int. Cl.
H04N 7/18 (2006.01)
H04N 5/225 (2006.01)

(52) U.S. Cl. .................... 348/143; 348/152; 348/169

(58) Field of Classification Search ......... 348/143–155, 348/169
See application file for complete search history.

(56) References Cited

U.S. PATENT DOCUMENTS

| 5,801,765 | A * | 9/1998 | Gotoh et al. ............... 348/155 |
| 5,886,744 | A * | 3/1999 | Hannah ................. 375/240.16 |
| 6,088,468 | A * | 7/2000 | Ito et al. .................... 382/103 |
| 6,211,912 | B1 * | 4/2001 | Shahraray ............... 348/228.1 |
| 6,297,844 | B1 * | 10/2001 | Schatz et al. ................ 348/43 |
| 6,646,655 | B1 * | 11/2003 | Brandt et al. ............... 715/723 |
| 6,765,569 | B2 * | 7/2004 | Neumann et al. .......... 345/419 |
| 2002/0067412 | A1 * | 6/2002 | Kawai et al. ............... 348/211 |
| 2002/0145660 | A1 * | 10/2002 | Kanade et al. .............. 348/36 |
| 2003/0184647 | A1 * | 10/2003 | Yonezawa et al. .......... 348/143 |

OTHER PUBLICATIONS

International Search Report PCT/US05/34864, Yin.

* cited by examiner

*Primary Examiner*—David Czekaj
(74) *Attorney, Agent, or Firm*—Venable LLP; Michael A. Sartori; Yao Wang

(57) ABSTRACT

A method of video processing may include analyzing input video information to determine if a current video frame is directed to a same view as a previous video frame; determining whether a new view is present; and indicating a need to use video processing information pertaining to the new view if a new view is determined to be present.

14 Claims, 9 Drawing Sheets

VIEW HANDLING IN VIDEO SURVEILLANCE SYSTEMS

FIELD OF THE INVENTION

This invention relates to surveillance systems. More specifically, the invention relates to a video-based surveillance system that is configured to run in an all-weather, 24/7 environment. Furthermore, the camera used in the surveillance system may be a pan-tilt-zoom (PTZ) camera, it may point to different scenes according to a schedule, and/or it may be in the form of a multiplexed camera system.

BACKGROUND OF THE INVENTION

An intelligent video surveillance (IVS) system should ideally detect, identify, track and classify targets in real-time. It should also send alerts in real-time if targets trigger user-defined rules. The performance of an IVS system is mainly measured by the detection rate and false alarm rate.

In some cases, a surveillance camera associated with an IVS system may have PTZ capability. In such a case, at certain times, the camera may point in one direction, and a user may define rules based on this particular view. At other times, the camera may point in some other direction, and in this situation, the user-defined rules used when the camera is pointing in the first direction may not make sense. As a result, at least some of the alerts generated would be false alarms. Additionally, when a camera points in different directions, corresponding to different scenes (for example, a water scene versus a non-water scene), different target detection algorithms may be desirable. In view of this problem, an IVS system should ideally detect if the camera switches from view to view and should allow a user to configure views and to enable different video surveillance algorithms and to define different rules based on different views.

In some cases, an IVS system may be connected to multiple cameras, where video signals may be fed through a multiplexer, and the system should recognize which camera the current video signal corresponds to and which set of rules should be used.

Additionally, a camera may be moved, or the signal of a camera may be disconnected, possibly by suspicious activities, and in these situations, certain alerts should be sent to the user. Furthermore, sometimes, a camera can not perform well under certain lighting conditions, for example, strong or low light, or a camera may have unusually high noise. In such situations, the IVS system should also notify the user that the video signal has a quality issue and/or that the camera should be checked.

SUMMARY OF THE INVENTION

The present invention may embodied as an algorithm, system modules, or computer-program product directed to an IVS system to handling multiple views, unexpected camera motion, unreasonable video quality, and/or the lost of camera signal.

According to one embodiment of the invention, a video surveillance apparatus may comprise a content analysis engine to receive video input and to perform analysis of said video input; a view engine coupled to said content analysis engine to receive at least one output from said content analysis engine selected from the group consisting of video primitives, a background model, and content analysis engine state information; a rules engine coupled to said view engine to receive view identification information from said view engine; and an inference engine to perform video analysis based on said video primitives and a set of rules associated with a particular view.

According to another embodiment of the invention, a video processing apparatus may comprise a content analysis engine coupled to receive video input and to generate video primitives, said content analysis engine further to perform one or more tasks selected from the group consisting of determining whether said one or more video frames include one or more bad frames and determining if a gross change has occurred.

According to yet another embodiment of the invention, a method of video processing may comprise analyzing input video information to determine if a current video frame is directed to a same view as a previous video frame; determining whether a new view is present; and indicating a need to use video processing information pertaining to said new view if a new view is determined to be present.

The invention may be embodied in the form of hardware, software, firmware, or combinations thereof.

Definitions

The following definitions are applicable throughout this disclosure, including in the above.

A "video" refers to motion pictures represented in analog and/or digital form. Examples of video include: television, movies, image sequences from a video camera or other observer, and computer-generated image sequences.

A "frame" refers to a particular image or other discrete unit within a video.

An "object" refers to an item of interest in a video. Examples of an object include: a person, a vehicle, an animal, and a physical subject.

A "target" refers to the computer's model of an object. The target is derived from the image processing, and there is a one-to-one correspondence between targets and objects.

"Foreground" refers to the area in a frame having meaningful change over time. For example, a walking person may be meaningful to a user, and should thus be considered as foreground. But some types of moving areas are not meaningful and should not be considered as background, such as water waves, tree leaves blowing, sun glittering, etc.

"Background" refers to the area in a frame where pixels depict the same thing, on average, over time. Note that foreground objects may occlude background pixels at times, so a particular pixel may be included in either foreground or background regions of various frames.

A "background segmentation algorithm" refers to an algorithm to separate foreground and background. It may also be referred to as a "foreground detection algorithm."

A "background model" refers to a representation of background. In the present case, background may have two corresponding images. One is a mean image, where each pixel is the average value of that pixel over a certain time when that pixel is in a background region. The other one is a standard deviation image, where each pixel corresponds to the standard deviation value of that pixel over a certain time when that pixel is in a background region.

A "view" refers to the model of a scene that a camera monitors, which includes the background model of the scene and a frame from the video representing an observation of the scene. The frame included in the view may, but need not, correspond to a latest observation of the scene.

A "BAD frame" refers to a frame in which the content in the video frame is too different from the background (according to some criterion).

A "gross change" occurs when there are significant changes in a video feed over a given predetermined period of time.

A "bad signal" refers to the case where the video feed into the IVS has unacceptable noise; the video feed may, for example, be too bright/dark, or the video signal may be lost.

An "unknown view" refers to the case in which the current view to which the camera points does not match any of the views in a view database.

A "known view" refers to a view to which a camera points, and which matches one of the views in a view database.

A "video primitive" refers to an analysis result based on at least one video feed, such as information about a moving target.

A "warm-up state" refers to when a content analysis module starts and needs some amount of time to build a background model, which may include a background mean and a background standard deviation. During this time period, the content analysis module is considered to be in a warm-up state.

A "computer" refers to any apparatus that is capable of accepting a structured input, processing the structured input according to prescribed rules, and producing results of the processing as output. Examples of a computer include: a computer; a general purpose computer; a supercomputer; a mainframe; a super mini-computer; a mini-computer; a workstation; a micro-computer; a server; an interactive television; a hybrid combination of a computer and an interactive television; and application-specific hardware to emulate a computer and/or software (for example, but not limited to, a programmable gate array (PGA) or a programmed digital signal processor (DSP)). A computer can have a single processor or multiple processors, which can operate in parallel and/or not in parallel. A computer also refers to two or more computers connected together via a network for transmitting or receiving information between the computers. An example of such a computer includes a distributed computer system for processing information via computers linked by a network.

A "computer-readable medium" or "machine-readable medium" refers to any storage device used for storing data accessible by a computer. Examples of a computer-readable medium include: a magnetic hard disk; a floppy disk; an optical disk, such as a CD-ROM and a DVD; a magnetic tape; and a memory chip.

"Software" refers to prescribed rules to operate a computer. Examples of software include: software; code segments; instructions; computer programs; and programmed logic.

A "computer system" refers to a system having a computer, where the computer comprises a computer-readable medium embodying software to operate the computer.

A "network" refers to a number of computers and associated devices that are connected by communication facilities. A network involves permanent connections such as cables or temporary connections such as those made through telephone or other communication links. Examples of a network include: an internet, such as the Internet; an intranet; a local area network (LAN); a wide area network (WAN); and a combination of networks, such as an internet and an intranet.

A "sensing device" refers to any apparatus for obtaining visual information. Examples include: color and monochrome cameras, video cameras, closed-circuit television (CCTV) cameras, charge-coupled device (CCD) sensors, analog and digital cameras, PC cameras, web cameras, and infra-red imaging devices. If not more specifically described, a "camera" refers to any sensing device.

A "blob" refers generally to any object in an image (usually, in the context of video). Examples of blobs include moving objects (e.g., people and vehicles) and stationary objects (e.g., furniture and consumer goods on shelves in a store).

BRIEF DESCRIPTION OF THE DRAWINGS

Specific embodiments of the invention will now be described in further detail in conjunction with the attached drawings, in which.

DETAILED DESCRIPTION OF EMBODIMENTS OF THE INVENTION

Overall System

Figure 1:
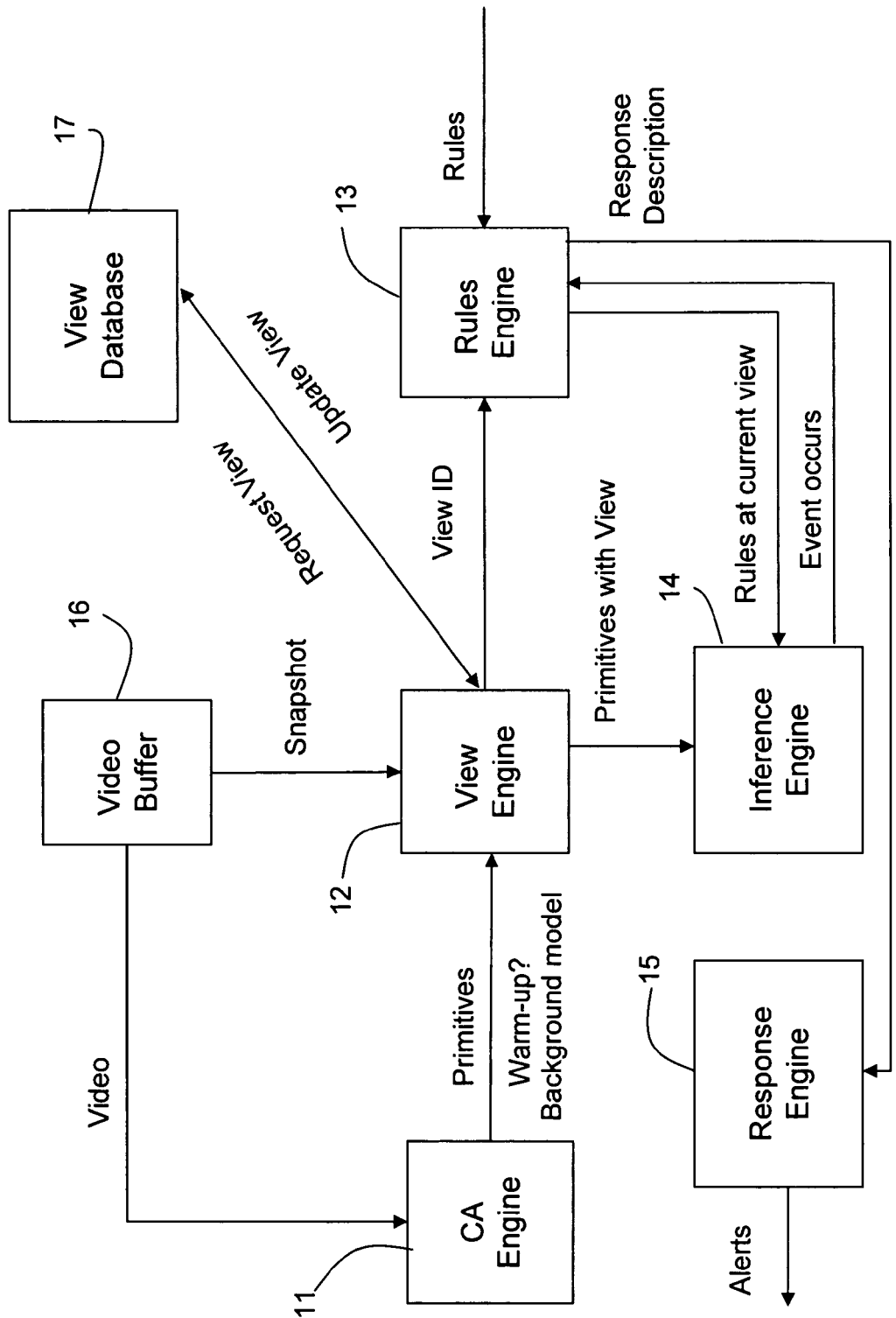
FIG. 1 depicts an overall system block diagram according to an embodiment of the invention.

FIG. 1 depicts an overall system block diagram according to an embodiment of the invention. When the IVS system starts, the view engine 12 loads all of the view information from a view database 17. The view engine 12 enters a searching mode and awaits notification from the content analysis (CA) engine 11 that it is warmed up. When it receives this notification, the view engine 12 enters another process, which may be called "view checking." View checking can determine whether the coming video feed is a bad signal, an unknown view or a known view. If view checking finds that the video feed switches from one known view to another known view, the view engine 12 will notify rules engine 13 that the view has changed, and the rules engine 13 will enable an appropriate rule set, depending on which view is active. Meanwhile, after warming up, CA engine 11 produces ordinary data ("video primitives") based on input video, which may be received from a video buffer 16. It passes this data to the View Engine 12, which attaches data on which view it was in when the video primitive was produced. The View Engine 12 forwards those primitives to the Inference Engine 14, which checks them against its current rule set. Inference Engine 14, upon detecting that a rule has been satisfied or broken, in other words, that an event has occurred, may notify Rules Engine 13, which may then determine an appropriate response for the event. Rules Engine 13 may then communicate with Response Engine 15, which may generate an alert or cause some sort of action to be taken. Therefore, embodiments of the present invention may be useful in detecting and countering terrorist activities.

There are two cases in which view checking occurs. One is a scheduled periodical view checking. The other is when the CA Engine 11 notifies View Engine 12 that it has warmed up. Note that CA Engine 11 enters its warm-up state when the system first starts or when a gross change happens, which will be discussed further below.

Figure 9:
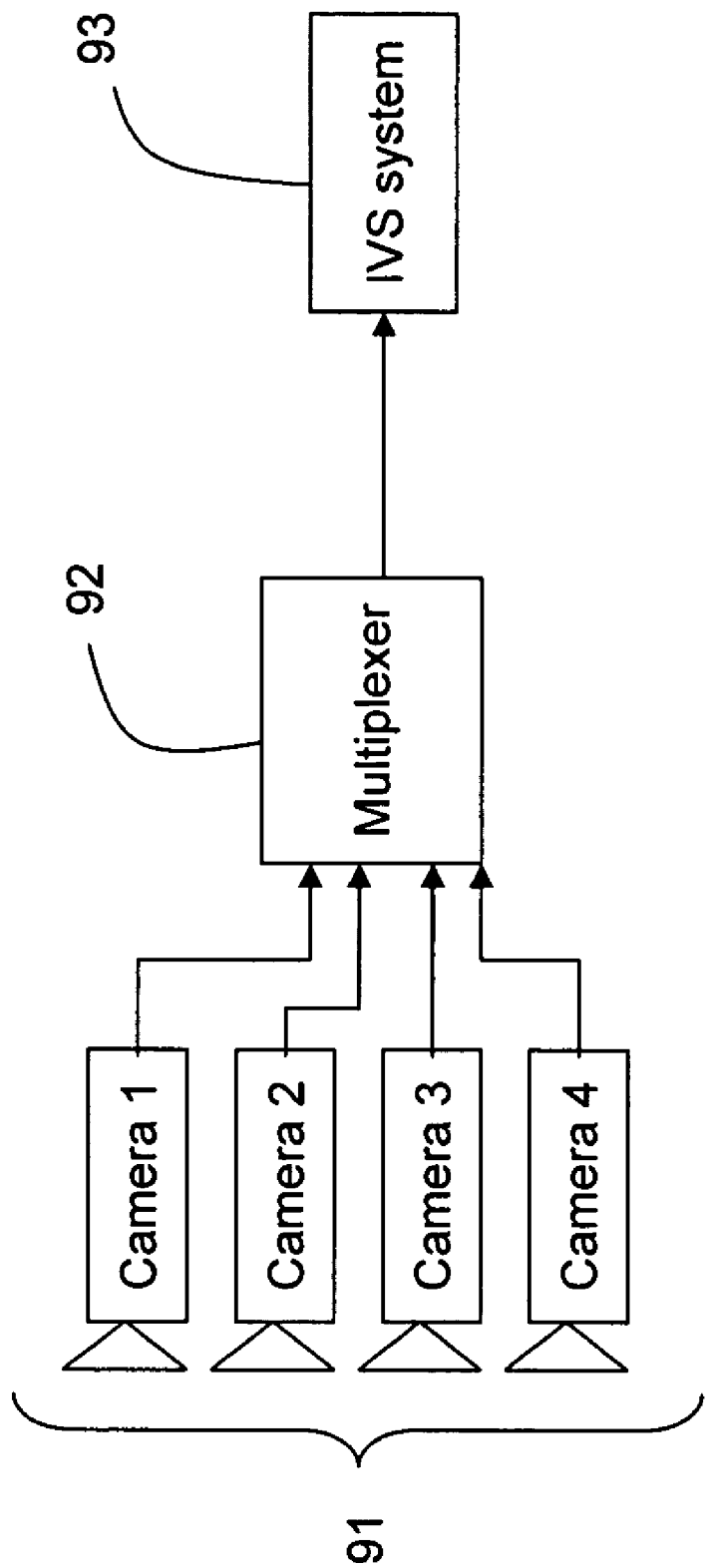
FIG. 9 depicts an exemplary multiplexed camera system, according to an embodiment of the invention.

As discussed above, a video buffer 16 may be used to provide video to CA Engine 11 of the IVS system. Alternatively, the video may be fed directly from a camera or other video source. In some embodiments of the invention, a multiplexed camera system, as shown in FIG. 9, may be used to feed video to the IVS system. In such a system, there may be multiple cameras 91, each of which may be observing a different view/scene. Outputs of cameras 91 are fed to a multiplexer 92, which then selects one of the camera outputs for feeding to the IVS system 93.

Figure 2:
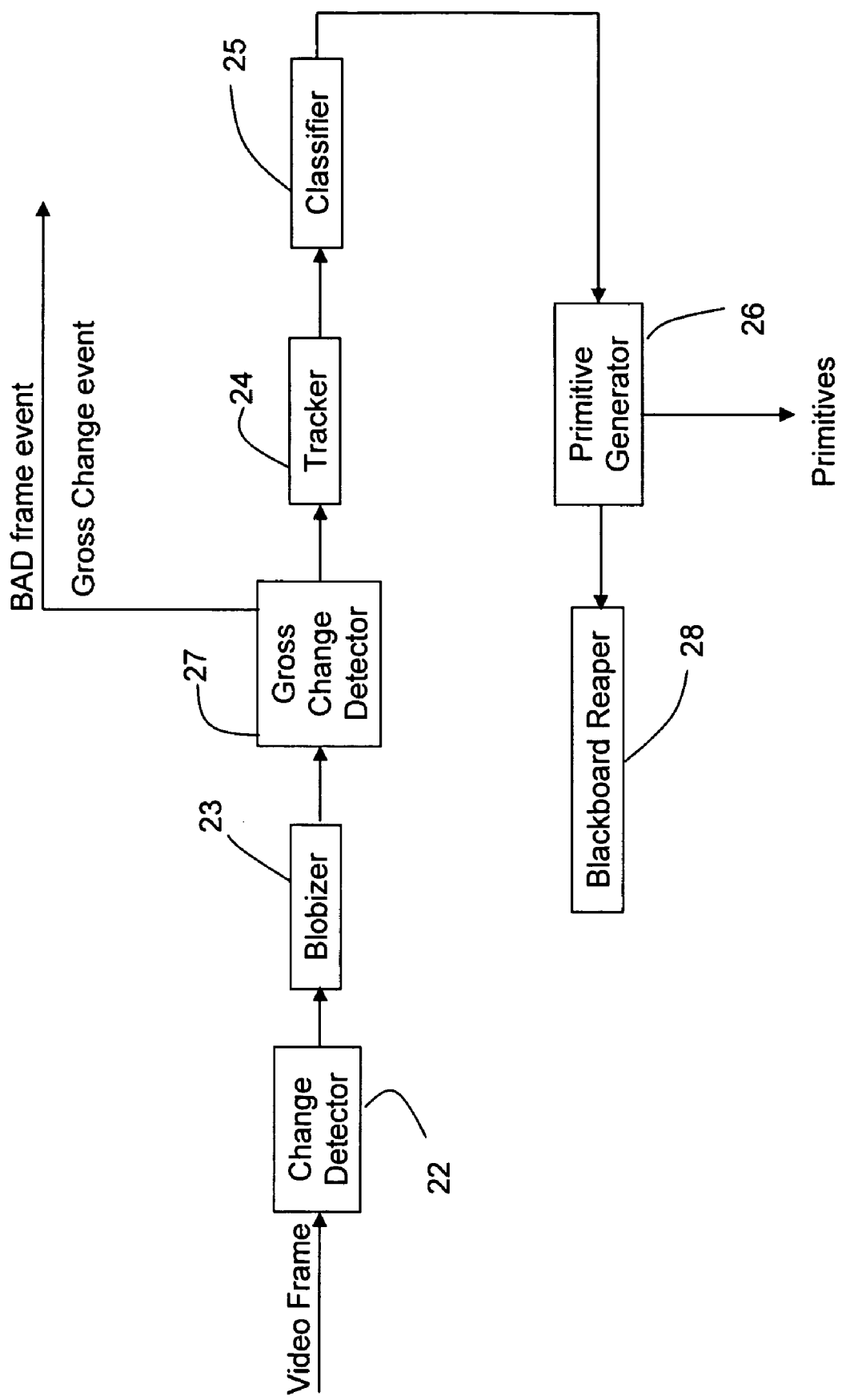
FIG. 2 depicts a block diagram of a content analysis module (CA Engine) which contains a Gross Change Detector, according to an embodiment of the invention.

FIG. 2 depicts a block diagram of a CA Engine module 11 in which a Gross Change Detector (GCD) 27 is enabled. A video signal is initially fed into modules to apply background segmentation. In the present exemplary embodiment, Change Detector 22 and Blobizer 23 are used to perform background segmentation. Additionally, if the area of the foreground, which is computed as the total number of pixels in the foreground, is lower than a predetermined threshold, GCD 27 considers the frame to be a "good" frame, and the data will go through the other modules of the CA engine module; that is, it proceeds through tracker 24, classifier 25, and primitive generator 26. If the foreground area is too significant (i.e., greater than some predetermined portion of the total frame area), the GCD 27 will mark the current frame as being a "BAD" frame, and it will generate a BAD frame event. When Blackboard Reaper 28 detects the BAD frame event, it deletes the data packet containing this BAD frame; that is, Blackboard Reaper 28 may serve as a data manager. GCD 27 will also classify the type of BAD frame. BAD frame types are kept in a histogram. If a predetermined number of consecutive BAD frames occur (or if consecutive BAD frames occur over a predetermined period of time), GCD 27 will generate a gross change event, and it also clears the BAD frame histogram. When it detects the gross change event, Primitive Generator 26 will generate a gross change primitive, Change Detector 22 and Tracker 24 will be reset, and Blackboard Reaper 28 will delete all the data packets generated after the gross change started to happen and up until the present time. CA Engine 11 will then notify all the engines that listen to it that it has re-entered a warm-up state.

Figure 3:
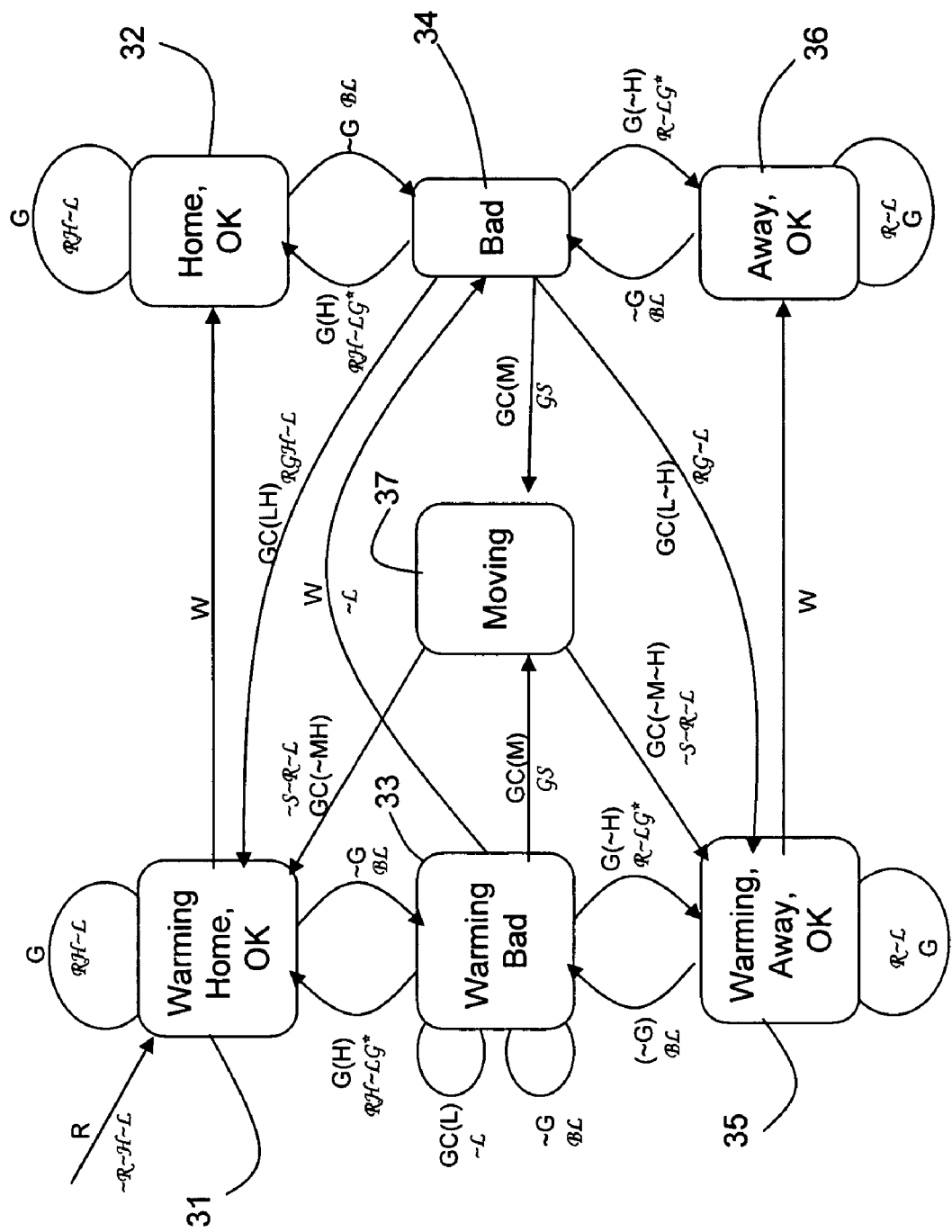
FIG. 3 depicts the structure of a Gross Change Detector according to an embodiment of the invention.

FIG. 3 depicts a state structure of a GCD 27 according to an exemplary embodiment of the invention, where GCD 27 is implemented as a state machine. Note that GCD 27 may be implemented in hardware, software, firmware, or as a combination thereof and need not be limited to a state machine. The state diagram of FIG. 3 includes states 31-37 and arrows indicating state transitions. The abbreviations used in connection with the arrows are explained as follows:

| Events (Which Can Cause State Change) | Actions (Upon State Change) |
| --- | --- |
| R-Reset | $\mathcal{R}$-set bad frame reference |
| W-sensor warms up | ~$\mathcal{R}$-clear bad frame reference |
| G-good frame detected | $\mathcal{H}$-set home frame |
| ~G-bad frame detected | ~$\mathcal{H}$-clear home frame |
| GC(M)-gross change (motion) | $\mathcal{L}$-update bad frame list |
| GC(L)-any gross change due to lighting | ~$\mathcal{L}$-clear bad frame list |

-continued

| Events (Which Can Cause State Change) | Actions (Upon State Change) |
| --- | --- |
| GC(LH)-gross change due to lighting in the home position | $\mathcal{S}$-set static camera reference |
| GC(L~H)-gross change due to lighting while not at home | ~$\mathcal{S}$-clear static camera reference |
| GC(~MH)-gross change due to camera not moving (back at home) | $\mathcal{B}$-generate bad frame event |
| GC(~M~H)-gross change due to camera not moving (camera away) | $\mathcal{G}$-generate gross change event ($\mathcal{G}^*$-if state has changed) |

In exemplary embodiments of the invention, there are four types of BAD frames: unknown bad frame; light-on bad frame; light-off bad frame; and camera-motion bad frame.

A BAD frame is classified as light-on if the mean of the current frame is larger than the mean of a reference frame by a certain amount, and it is classified as light-off if the mean of the current frame is less than the mean of a reference image by a certain amount. Here, the mean of a frame is defined to be the average of all the pixels in the frame; and the reference image is taken to be the mean image in the background model, where, as previously defined, each pixel of the mean image is the average value of that pixel over a certain number of frames in which the pixel is considered to be a background pixel. A BAD frame is classified as camera-motion if the similarity between the BAD frame and the reference image is lower than a certain threshold. A similarity computation algorithm will be introduced below. A BAD frame that does not fall into any of the other three categories is classified as being unknown.

When GCD 27 detects a BAD frame, it puts the BAD frame type into a histogram. If GCD 27 detects consecutive BAD frames and if the time duration of these BAD frames is larger than a predetermined threshold, the GCD 27 generates a gross change event. Note that the threshold may, equivalently, be expressed in terms of a number of consecutive BAD frames. The type of the gross change is determined by examining the BAD frame histogram, and the gross change type corresponds to the BAD frame type having the maximum number of BAD frames in the histogram. If a good frame is detected after a BAD frame, where the number of BAD frames is still less than the predetermined threshold, the BAD frame histogram is cleared.

As discussed above, when a gross change event is sent out by GCD 27, CA 11 enters its warm-up state.

Figure 4:
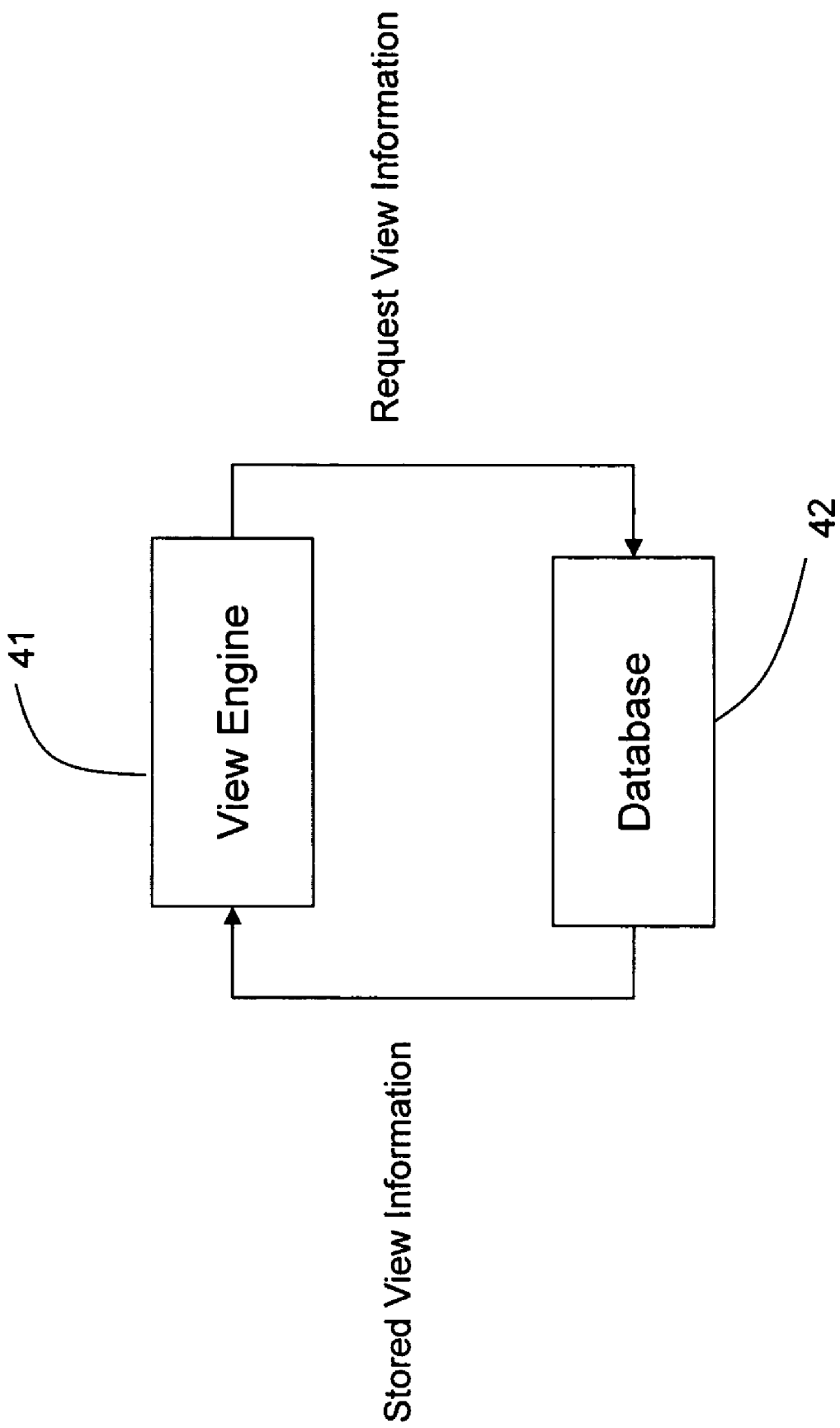
FIG. 4 depicts the data flow of a View Engine when IVS system starts up, according to an embodiment of the invention.

FIG. 4 depicts an exemplary data flow with respect to a View Engine 41, which may correspond to View Engine 12 of FIG. 1, when the IVS system starts up. As shown, View Engine 41 may request view information from a database 42. The database 42 may forward the requested stored view information to View Engine 41.

Figure 5:
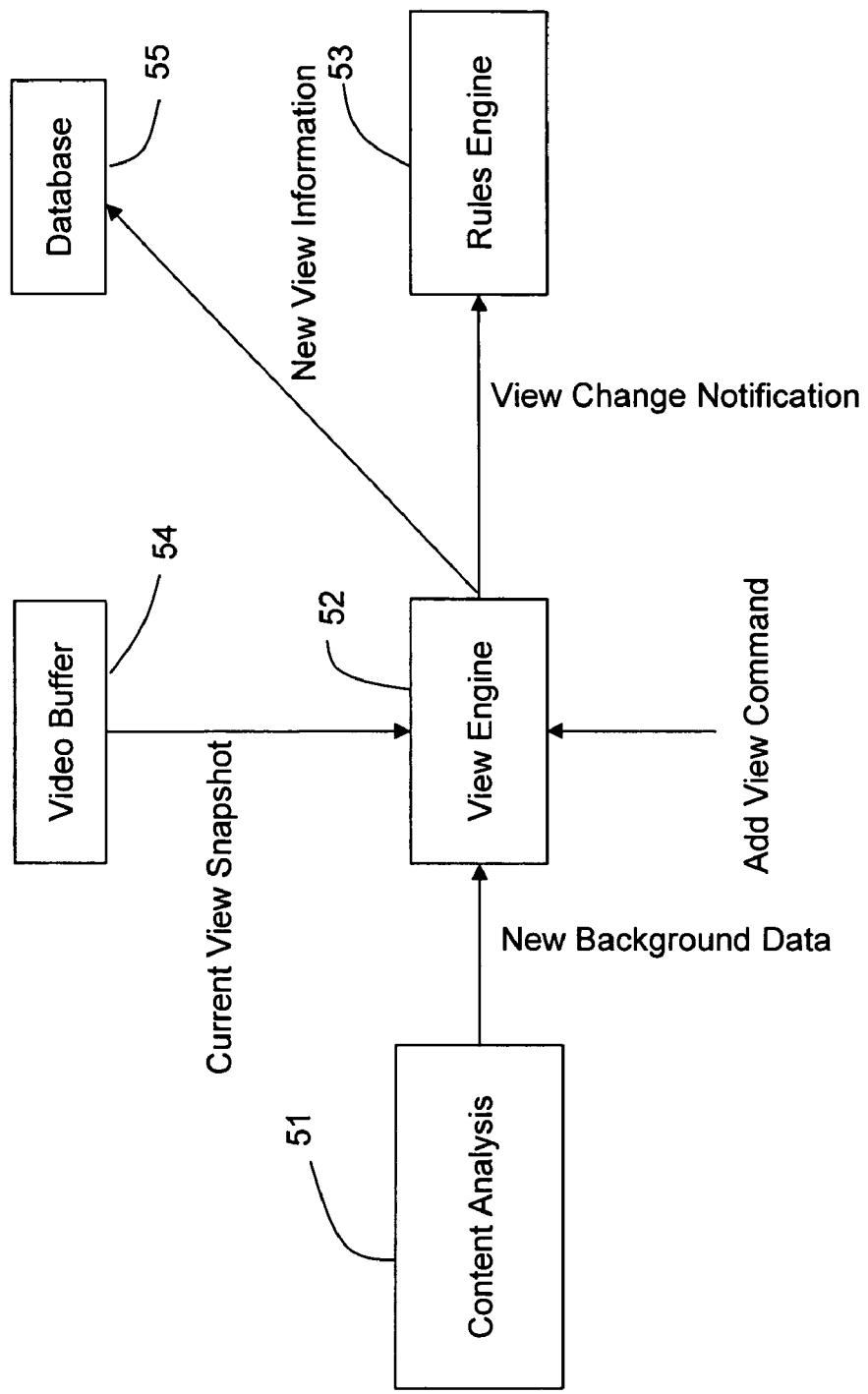
FIG. 5 depicts the data flow relating to a View Engine when a user adds a view, according to an embodiment of the invention.

FIG. 5 depicts an exemplary data flow with respect to a View Engine 52 (which, again, may correspond to the View Engine 12 of FIG. 1) when a user adds a view. The View Engine 52 receives an Add View command. It receives new background data from CA engine 51 and a current view snapshot from video buffer 54. In response, View Engine 52 forwards information about the new view to database 55 and sends a notification of a view change to Rules Engine 53, which is a module that maintains all the user-defined rules. This will be further elaborated upon below.

Figure 6:
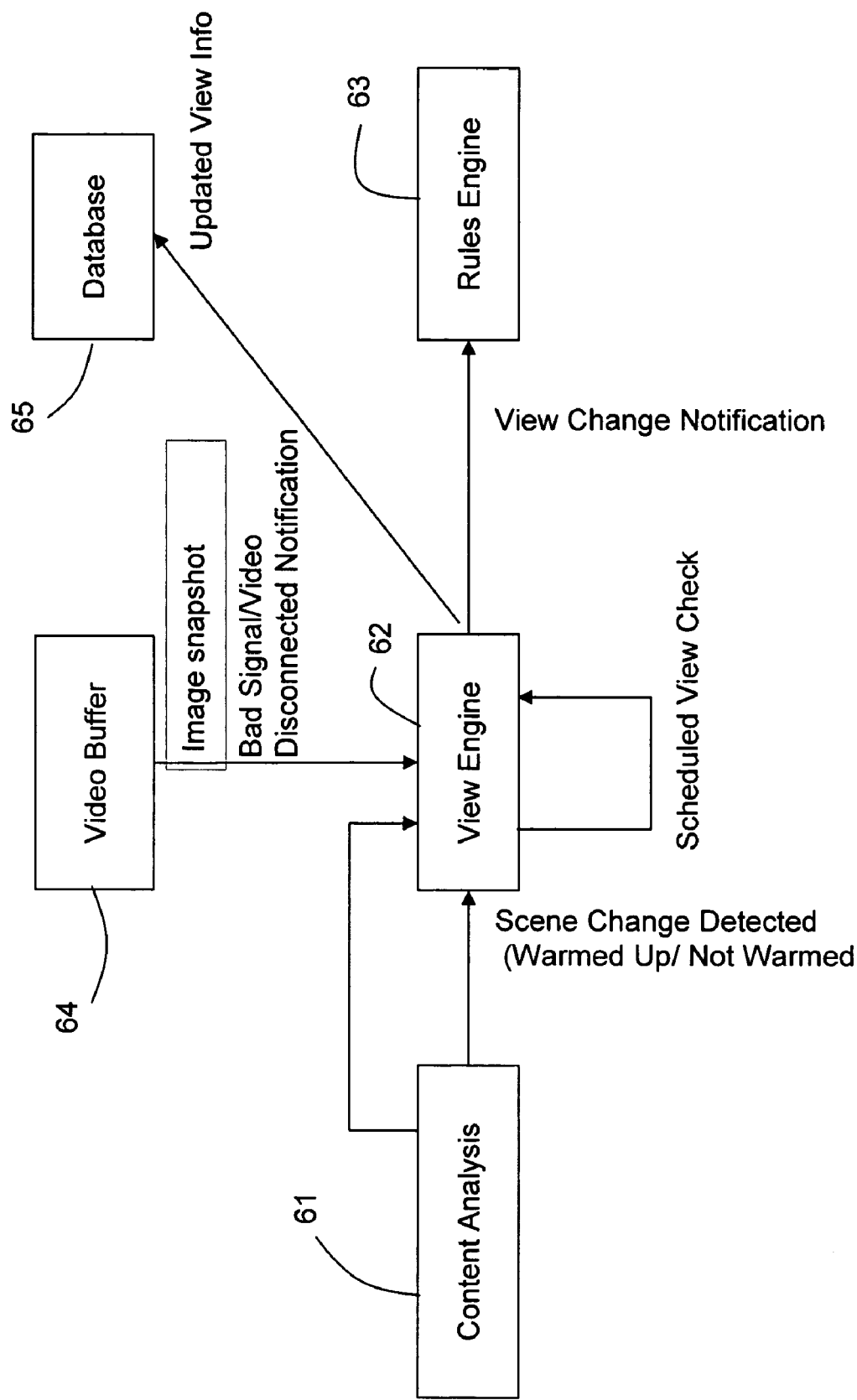
FIG. 6 depicts how a View Engine may perform view checking according to an embodiment of the invention.

FIG. 6 depicts how a View Engine 62 (which may correspond to View Engine 12 of FIG. 1) performs view checking, according to an embodiment of the invention. View checking will be discussed in further detail below.

Figure 7:
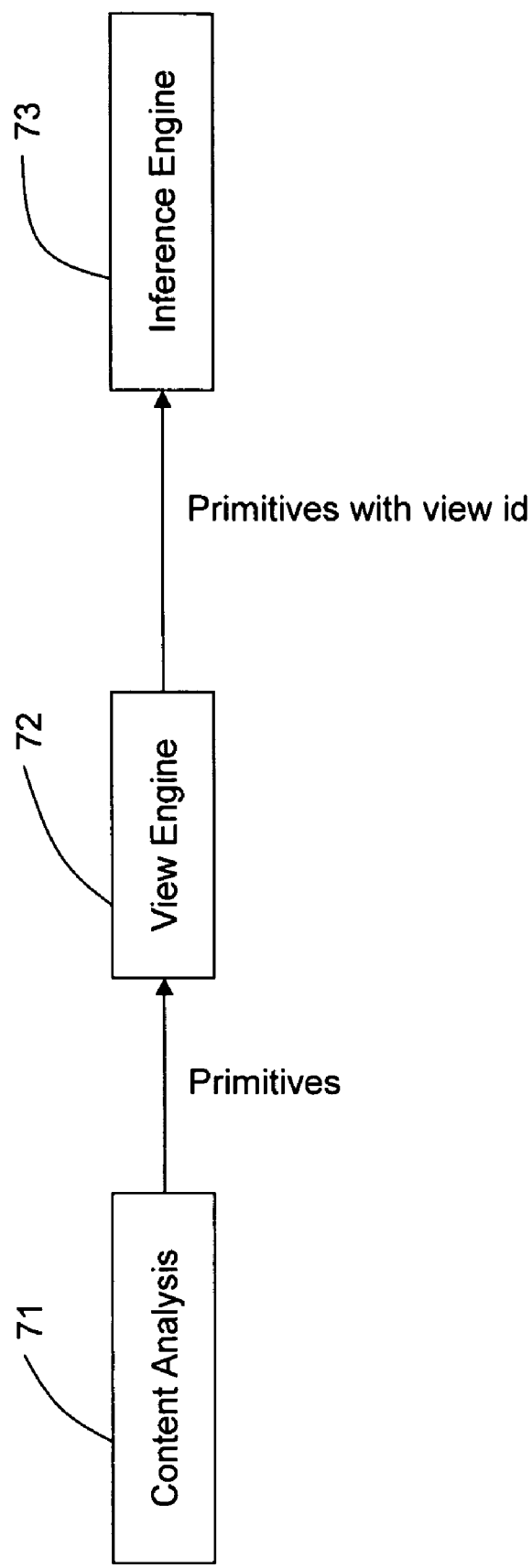
FIG. 7 depicts the data flow of a View Engine when IVS system is in the steady state, according to an embodiment of the invention.

FIG. 7 depicts the data flow of View Engine 72 (which may correspond to View Engine 12 of FIG. 1) when the IVS system is in the steady state, according to an embodiment of the invention. In the steady state, CA engine 71 provides View Engine 72 with video primitives. View Engine 72, in turn, takes the video primitives and provides them to Inference Engine 73 along with view identification information ("view id"), where Inference Engine 73 is a module for comparing primitives against rules to see if there is any rule being broken (or satisfied) by one or more targets, represented by the primitives. The steady-state operation of View Engine 72 will be discussed in further detail below.

The View Engine, in general, stores and detects different scenes that come into a system from a video feed. The most common ways for the signal on the video feed to change is when multiple video sources are passed through a multiplexer and when a Pan-Tilt-Zoom camera is being used to point to different scenes from time to time. The View Engine stores camera views. In its most basic form, a camera view consists of:

Background model (background mean and standard deviation images)
Image snapshot.

A more complex version of a camera view may have multiple model-snapshot pairs taken at intervals over a time period.

The view engine may be in several states:
Searching
Unknown View
Known View
Bad Signal The operations shown in the embodiments of FIGS. 4-7 will now be described in further detail.

Add View

When the system (i.e., View Engine 52 in FIG. 5) is running in the "unknown view" state, an outside application can send an add view command into the system. The View Engine 52 gets the latest background model from the CA engine 51 and the latest image from the video buffer 54. It uses those to build a camera view and stores the camera view in the database 55. View Engine 52 then sets its internal state to "known view" and notifies the Rules Engine 53 that it is in the new view.

Startup

Startup operations may be demonstrated by the embodiment shown in FIG. 4. On startup, the View Engine 41 loads all of its view information from a database 42. The View Engine 41 enters into a searching mode and waits for notification from the CA engine (11, in FIG. 1) that it is warmed up. When it receives this notification, the View Engine 41 begins view checking.

The CA engine 11 takes a certain amount of time to warm up. During that time, it is building up a model of the background in the scene it is viewing. At this time, View Engine 12 is in the "searching" state. When CA engine 11 is warmed up, it notifies the View Engine 12.

If the video feed experiences a large change (for example, someone turned off the lights, someone hit the camera, a PTZ camera is pointing to a different scene, or a multiplexer switches to a new camera), the CA Engine 11 will reset. When CA engine 11 resets, it moves into the not warmed up state and notifies the View Engine 12 that it is no longer warmed up. This moves the View Engine 12 into the "Searching" state.

View Checking

View checking is the process of determining whether the feed coming into the system is in a bad signal state, an unknown view or a known view. View checking, according to an embodiment of the invention, is shown in FIG. 6. The View Engine 62 requests the latest background model from the CA engine 61 and attempts to determine if the video feed is a bad signal, which may occur, for example, if the camera is getting insufficient light or if the camera has unusually high noise. An algorithm for detecting whether or not the signal is bad will be discussed below. If that is the case, it moves into the Bad Signal state. Next, it compares the latest background model against the background models for all of the stored views. If a match is found, the View Engine 62 moves into the Known View state. If no match is found, the View Engine 62 moves into the Unknown View state. If the current state differs from the previous state, it notifies the Rules Engine 63 that the state has changed. If it has moved to a Known View, it also notifies the Rules Engine 63 which view it is now in. The Rules Engine 63 will modify the rule set that is enabled depending on which view is active.

View Checking happens in two cases. The first is when the CA Engine 61 notifies View Engine 62 that it has warmed up. The second is a regularly scheduled view check that View Engine 62 performs when it is in a known view. When it is in a known view, the View Engine 62 checks the view periodically, according to a predetermined period, to confirm that it is still in that known view. When the view check occurs, the View Engine 62 may update the database 65 with more recent view information.

View Checking/Similarity Computing Algorithm

There are numbers of ways to do view checking or to compare if two images are similar. One algorithm that may be used in some embodiments of the invention is as discussed below. Note that for View Checking, the two images that used are the mean images of the background model in the two compared camera views; however, the algorithm is also useful for general similarity comparisons (in which a frame may be compared against a reference frame).

The exemplary algorithm may go as follows:

Apply an edge detection algorithm to the two images to obtain two edge images. There are many such edge detection algorithms known in the art that may be used for this purpose.

Calculate the median value of the edge images, and then use a multiple of the median value as a threshold to apply to the two edge images to generate two binary edge masks separately. In the binary mask, a "0" value for a pixel may be used to denote that an edge value at that pixel is lower than the threshold, and this represents that the edge is not strong enough at that pixel; a "1" value may be used to denote that the edge value for the pixel is greater than or equal to the threshold (alternatively, the roles of "0" and "1" may be reversed; however, the ensuing discussion will assume the use of "0" and "1" as discussed above).

Collapse each edge mask into horizontal and vertical vectors, H and V, respectively, where H[i] is the number of "1" pixels in row i, and V[i] is the number of "1" pixels in column i. Thus, each edge mask will be represented by two vectors.

Apply a window filter to all four vectors. In some embodiments of the invention, a trapezoidal window may be used.

Compute the correlation, $C_h$, between the two horizontal vectors and the correlation, $C_v$, between the two vertical vectors (the subscripts "1" and "2" are used to denote the two images being considered; the superscript "T" represents the transpose of the vector):

$$C_h = (H_1 H_2^T)^2 / (H_1 H_1^T * H_2 H_2^T)$$

$$C_v = (V_1 V_2^T)^2 / (V_1 V_1^T * V_2 V_2^T)$$

If both $C_h$ and $C_v$ are larger than a certain predetermined threshold, the algorithm determines that the two images are similar, where similar means that there is no motion between the two images. In the case of View Checking, this will mean that the algorithm will determine that the two views are similar or not similar.

Signal Quality Verification Algorithm

There are many known ways to check video signal quality, any of which may be used in embodiments of the invention. The following exemplary algorithm is an example of one that may be used in various embodiments of the invention.

The exemplary algorithm uses both mean and standard deviation images of the background model. If the mean of the standard deviation image, which is the average of all the pixel values in the standard deviation image, is too small (i.e., less than a predetermined threshold), the algorithm determines that the video feed has low contrast, and the signal from the video feed is considered to be a BAD signal. The algorithm can further detect if the video feed is too bright or too dark by checking the mean of the mean image, which is the average of all the pixel values in mean image. If the mean value is too small, the video feed is too dark, and if the mean value is too large, the video feed is too bright. If the mean of the standard deviation image is too large (i.e., larger than some predetermined threshold), the algorithm determines that the video feed is too noisy, which also corresponds to a BAD signal type.

If a background model is not available, one may alternatively collect a set of video frames to generate mean and standard deviation images and use these mean and standard deviation images to classify the quality of the incoming video signals.

Steady-State

Steady state operation is shown in FIG. 7, according to an embodiment of the invention. After it warms up, CA Engine 71 produces ordinary data ("video primitives") about the video it is processing. It passes this data to the View Engine 72. If the View Engine 72 is in the Known View state, it attaches data on which view it was in when the video primitives were produced, and View Engine 72 forwards those primitives to the Inference Engine 73. Inference Engine 73 checks them against its current rule set. If the View Engine 72 is in the Unknown View state, the video primitives should be deleted.

Note that even when View Engine 72 is in the Unknown View state, it may still be possible to utilize the video primitives, and there are certain rules that can be applied to these primitives, such as rules to detect gross changes and targets appearing or disappearing. In this case, the View Engine 72 may send these primitives to Inference Engine 73 to check against these rules.

Other Embodiments

Figure 8:
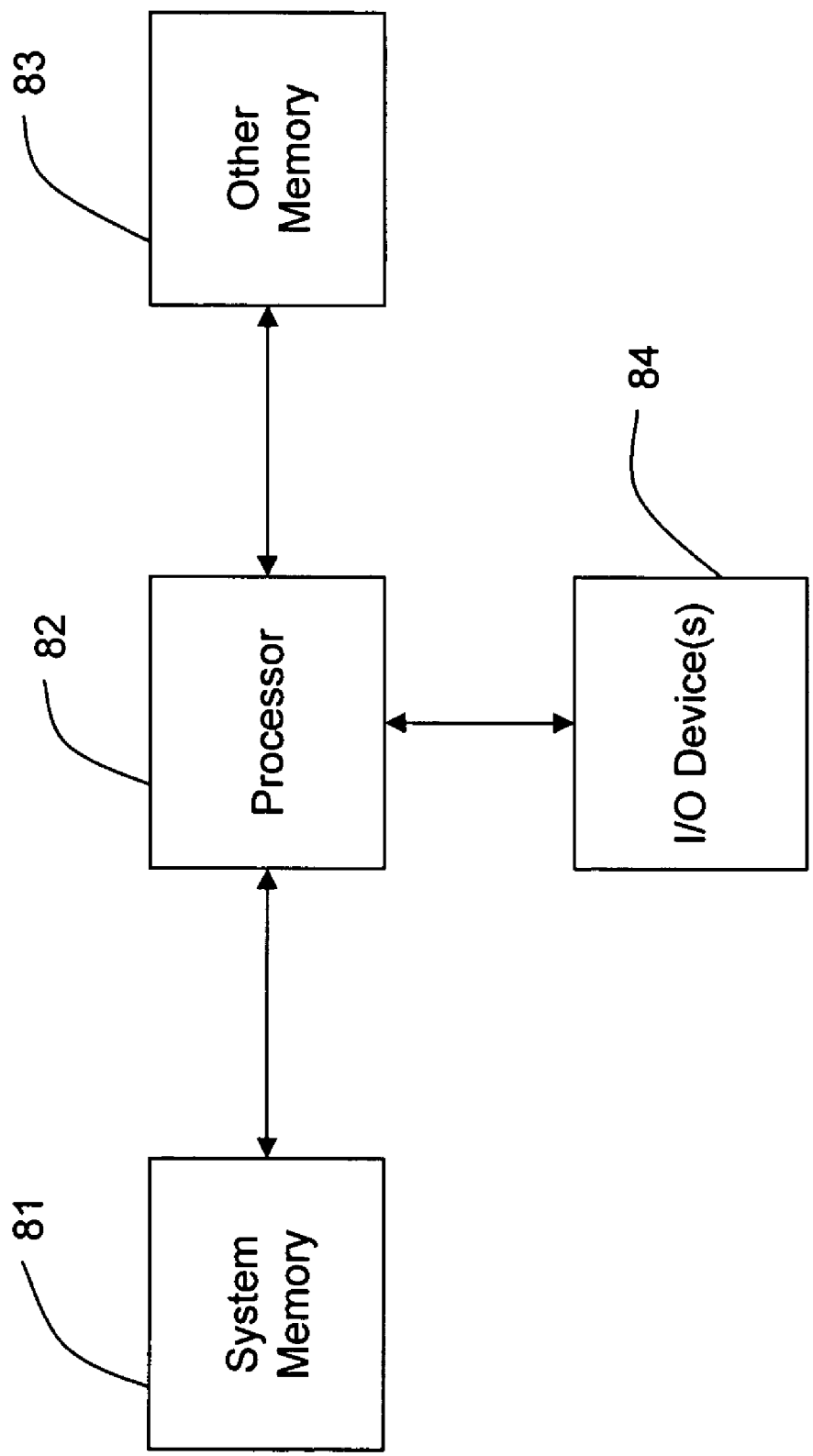
FIG. 8 depicts a system which may be used to implement some embodiments of the invention.

Some embodiments of the invention, as discussed above, may be embodied in the form of software instructions on a machine-readable medium. Such an embodiment is illustrated in FIG. 8. The computer system of FIG. 8 may include at least one processor 82, with associated system memory 81, which may store, for example, operating system software and the like. The system may further include additional memory 83, which may, for example, include software instructions to perform various applications. The system may also include one or more input/output (I/O) devices 84, for example (but not limited to), keyboard, mouse, trackball, printer, display, network connection, etc. The present invention may be embodied as software instructions that may be stored in system memory 81 or in additional memory 83. Such software instructions may also be stored in removable or remote media (for example, but not limited to, compact disks, floppy disks, etc.), which may be read through an I/O device 84 (for example, but not limited to, a floppy disk drive). Furthermore, the software instructions may also be transmitted to the computer system via an I/O device 84 for example, a network connection; in such a case, a signal containing the software instructions may be considered to be a machine-readable medium.

The invention has been described in detail with respect to various embodiments, and it will now be apparent from the foregoing to those skilled in the art that changes and modifications may be made without departing from the invention in its broader aspects. The invention, therefore, as defined in the appended claims, is intended to cover all such changes and modifications as fall within the true spirit of the invention.

What is claimed is:

1. A method of video processing, the method comprising:
   receiving a single video feed provided by a source, wherein the source is one of a video buffer, a camera, or a multiplexer coupled to a plurality of cameras;
   determining a known view model set comprising at least one known view model representing a scene of the single video feed and comprising a video frame from the single video feed and a background model of the scene;
   creating video analytics functionally relevant to the scene represented by at least one known view model of the known view model set;
   receiving a current frame from the single video feed;
   determining which known view model from the known view model set represents the scene depicted in the current frame, wherein the determined known view model is designated as a current known view model;
   performing video analytics for the current known view model on the current frame;
   receiving a next frame from the single video feed; and
   determining whether the next frame is directed to the current known view model by using video processing;
   if the video processing determines that the next frame is directed to the current known view model, performing video analytics for the current known view model on the next frame; and
   if the video processing determines that the next frame is not directed to the current known view model, determining whether the next frame is directed to any other known view model of the known view model set by using video processing;
   if the video processing determines that the next frame is directed to a different known view model of the known view model set, performing video analytics for the different known view model on the next frame; and
   if the video processing determines that the next frame is not directed to any other known view model of the known view model set, discarding the next frame.

2. The method according to claim 1, wherein said video processing comprises:
   performing analysis to determine whether said next frame should be discarded by comparing a foreground area of the next frame with a threshold.

3. The method according to claim 1, further comprising:
maintaining a histogram of discarded frames according to discarded frame types; and
upon the occurrence of a predetermined number of consecutive discarded frames, determining that a gross change has occurred.

4. The method according to claim 3, further comprising:
if a gross change has occurred, selecting a type of gross change based on said histogram.

5. The method according to claim 3, further comprising:
clearing said histogram if said next frame is not a discarded frame.

6. The method according to claim 1, further comprising:
retrieving stored view information based on at least a portion of the current frame; and
using said stored view information to select an initial set of rules,
wherein view information comprises the background model of the current known view model.

7. The method according to claim 1, further comprising:
adding a new known view model based on the next frame to the known view model set.

8. The method according to claim 7, wherein said adding the new known view model comprises:
obtaining background data associated with a new view;
obtaining an image representing said new view;
storing said new view with the known view model set; and
providing view change notification to indicate a need to use new video analytics associated with said new known view model.

9. The method according to claim 1, wherein said video processing comprises:
evaluating if signal quality of said next frame falls outside an acceptable range.

10. A machine-readable medium containing instructions that, when executed by a processor, cause the processor to perform the method according to claim 1.

11. A computer system comprising:
a processor to receive the single video feed provided by the source; and
at least one computer-readable medium containing instructions that, when executed by the processor, cause the processor to perform the method according to claim 1.

12. The method according to claim 1, wherein the video processing to determine whether the next frame is directed to the current known view model:
applying edge detection to images associated with the current known view model and the next frame model to obtain first and second edge images;
determining first and second edge masks for the first and second edge images;
determining first horizontal and vertical vectors for the first edge mask and second horizontal and vertical vectors for the second edge mask;
determining a horizontal correlation for the first and second horizontal vectors and a vertical correlation for the first and second vertical vectors; and
determining whether said next frame is directed to the current known view model based on the horizontal and vertical correlations.

13. The method according to claim 1, wherein the video analytics for the current known view model comprises:
enabling a rule set corresponding to the current known view model;
checking video primitives based on the current frame against the rule set;
detecting an event if a rule in the rule set has been satisfied by checking the video primitives; and
determining an appropriate response for the event.

14. The method according to claim 1, wherein the background model for the current known view model comprises a background mean and at least one standard deviation image.

* * * * *